United States Patent

[11] 3,618,040

[72] Inventors Shoji Iwamoto
Kokubunji-shi;
Hisashi Horikoshi, Tachikawa-shi, both of Japan

[21] Appl. No. 858,639
[22] Filed Sept. 17, 1969
[45] Patented Nov. 2, 1971
[73] Assignee Hitachi, Ltd.
Tokyo, Japan
[32] Priority Sept. 18, 1968
[33] Japan
[31] 43-66915

[54] MEMORY CONTROL APPARATUS IN MULTIPROCESSOR SYSTEM
10 Claims, 5 Drawing Figs.

[52] U.S. Cl. .......... 340/172.5
[51] Int. Cl. .......... G06f 15/16
[50] Field of Search .......... 340/172.5; 235/157

[56] References Cited

UNITED STATES PATENTS

| | | | |
|---|---|---|---|
| 3,317,898 | 5/1967 | Hellerman | 340/172.5 |
| 3,319,226 | 5/1967 | Mott et al. | 340/172.5 |
| 3,398,405 | 8/1968 | Carlson et al. | 340/172.5 |
| 3,528,061 | 9/1970 | Zurcher, Jr. | 340/172.5 |

*Primary Examiner*—Gareth D. Shaw
*Attorney*—Craig, Antonelli & Hill

ABSTRACT: Information transferred from a main memory with energy block is stored in two high-speed buffer memories provided in two respective central processors, and the address signals of said information are held in a register. Upon access of one of said central processors to the main memory, address signals therefrom are compared with the address signal held in said register by a first compare circuit, and thus if there is any coincident address signal, then access to the buffer memory is permitted. When the other central processor effects "write-in" with respect to the main memory, an address signal forwarded by said other central processor is compared with the address signals held in said register by a second compare circuit, and thus if there is any coincident address signal, then the corresponding information is made invalid so as to avoid disagreement between the contents of the main memory and buffer memories.

MEMORY CONTROL APPARATUS IN MULTIPROCESSOR SYSTEM

BACKGROUND OF THE INVENTION

1. Field of the Invention

This invention relates to a memory control apparatus in a multiprocessor system wherein each of the processors is provided with a buffer memory.

2. Description of the Prior Art

As a result of the development of semiconductor circuit techniques such as integrated-circuit techniques, large-scale integration techniques and so forth, the speed and scale of the central processor for electronic computers have been increased, thus having resulted in a remarkably improved execution time.

Heretofore, efforts have also been made and are still being made to increase the speed of the main memory for electronic computers. However, since the speedup of the central processing operation has progressed too rapidly, a gap has gradually occurred between the speeds of those two units. Due to this fact, the performance of an electronic computer is limited by the speed of the main memory thereof.

In order to solve such a problem, there has recently been proposed a method in which a small-capacity buffer memory, permitting high-speed access, is provided for the central processor; when new information is read out of the large-capacity main memory by the central processor, the new information and a predetermined amount of information adjoining said new information are transferred to the buffer memory, and when the information thus read out is required, it is read out of the buffer memory. It has already been proven that this method is effective. (D. H. GIBSON; Conditions in block-oriented systems design; SJCC, 1967).

In the aforementioned method, for a write request by the central processor for information at a certain address, a "write operation" is effected with respect to said address in the main memory, detection is made as to whether or not information corresponding to said address exists in the buffer memory as valid information, and if said information is present in the buffer memory, then said information in said buffer memory is also rewritten.

However, the following problem tends to arise if the aforementioned method is applied to the multiprocessor system. That is, in the multiprocessor system, a main memory is used in common by a plurality of central processors for independently effecting information processing. Hence, in the case where information is read out of the aforementioned main memory by a predetermined amount to be transferred to the buffer memory of any one of the central processors, there will occur an occasion that when the information content concerning a certain address of the main memory is rewritten by one of the central processors, the information at this address happens to have been read out and transferred to the buffer memories of the other central processors, so that such information can be used by being read out of said buffer memories rather than being read out of the main memory again. On such an occasion, there is the possibility that disagreement will occur between the memory contents of the main memory and the buffer memory so that subsequent operation is erroneously effected.

In order to cope with such a situation, detection is made, not only as to whether the required information is processor makes in the buffer memory of that one of memory, central processors which has made a write request, but also whether such information is present in each of the buffer memories of the other central processors, and that there is provided means for rewriting or making invalid the content of said information in information buffer memories of the other central processors when the information is present therein.

The most generally conceivable method is to interrupt all the other central processors when one of the central processors makes a write request with respect to the main memory, make detection as to whether that information in said main memory at the address where the "write" is effected has been read out and transferred to the respective buffer memories, and rewrite or make invalid this information only when the information has been read out.

With such a method, however, all the central processors are stopped from operation whenever a "write operation" is effected, in order to prevent the occurrence of such a situation as described above, which has a small probability. Thus, there results the disadvantage such that the operation speed of the electronic computer is reduced.

SUMMARY OF THE INVENTION

It is a primary object of the present invention to provide a memory control apparatus in a multiprocessor system which is so designed as to enable the central processors to perform high-speed operation.

Another object of the present invention is to provide a memory control apparatus in a multiprocessor system which is so designed as to prevent disagreement between the memory contents of the main memory and buffer memories.

Still another object of the present invention is to make it possible to detect whether certain information is stored in the buffer memories, without stopping the operation of the central processors.

Accordingly, the gist of the present invention resides in the provision of a memory control apparatus in a multiprocessor system comprising a plurality of central processors, a main memory to which said plurality of central processors are accessible in common, buffer memories correspondingly provided for said central processors respectively, for reading out and storing information stored in said main memory by a predetermined amount, and memory control means provided in said buffer memories respectively, said memory control means being adapted to control write-in and readout with respect to said buffer memories, wherein said memory control means include means for detecting whether the information required by a central processor is stored in the buffer memory thereof as valid information, and means for detecting whether information which is rewritten by another central processor is stored in said buffer memory.

DETAILED DESCRIPTION OF THE PREFERRED EMBODIMENTS

Figure 1:
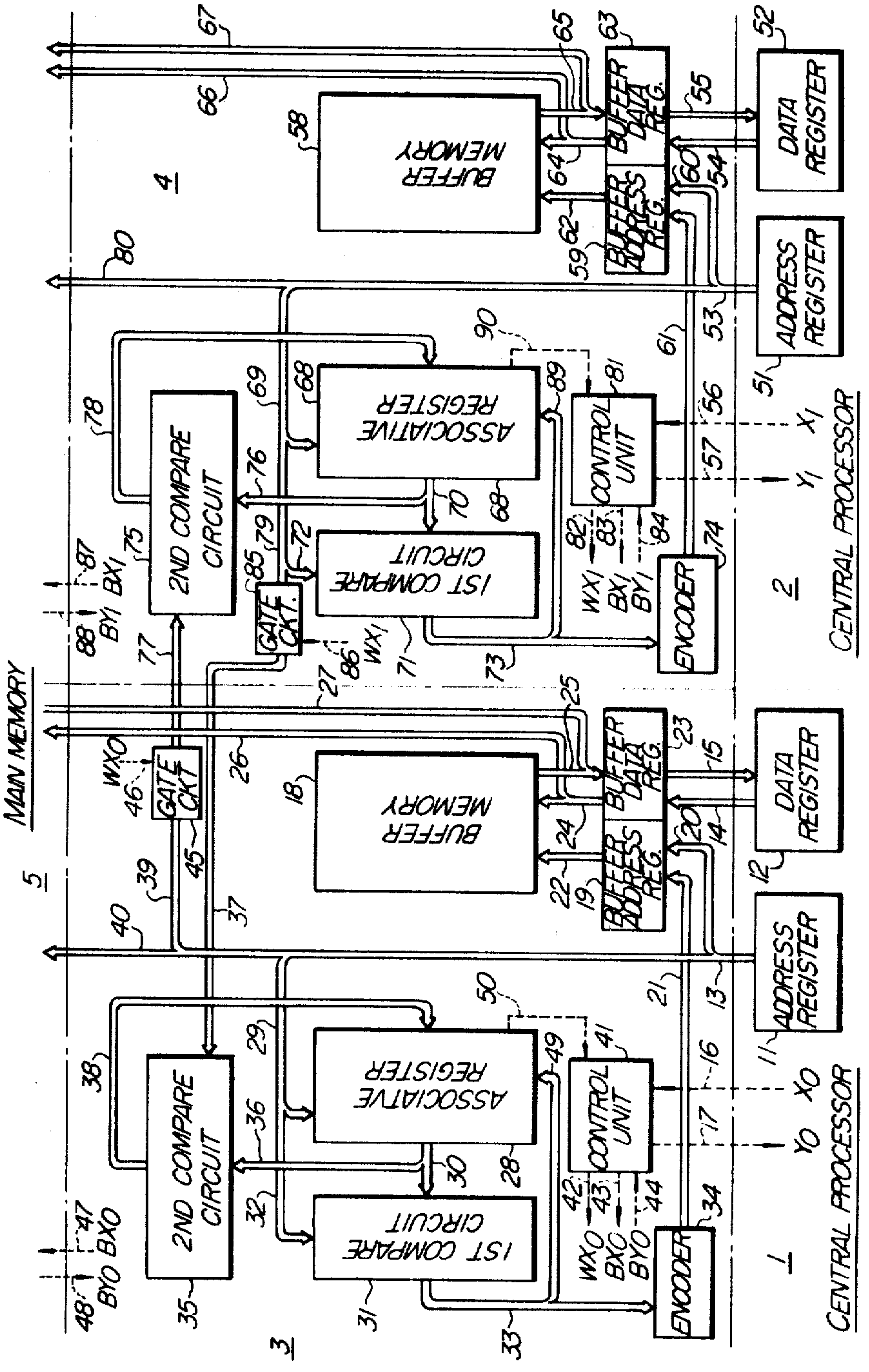
FIG. 1 is a block diagram showing the main portion of the memory control apparatus according to an embodiment of the present invention.

Referring to FIG. 1, there is schematically shown the main portion of the memory control apparatus according to an embodiment of the present invention which comprises two central processors 1 and 2, two buffer memory means 3 and 4 incorporated in the two central processors 1 and 2 respectively, and a main memory 5 common to the aforementioned central processors 1 and 2. In FIG. 1, the arrangements of the central processors 1 and 2 and main memory 5 are not shown. The buffer memory means 3 and 4 are shown as having identical construction, for the sake of simplicity. Needless to say, these buffer memory means may have a different construction.

An address signal is supplied from address register 11 of the central processor 1 to the buffer memory means 3 and main memory 5 through a signal line 13. Further, a data signal is passed from a data register 12 to the buffer memory means 3 through a signal line 14. A data signal from the buffer memory means 3 which is required by the central processor 1 is set in the data register 12 through a signal line 15. Furthermore, a request signal $X_0$ for instructing "write-in" or "readout" is sent from the central processor 1 to the buffer memory means 3 through a control signal line 16. From the buffer memory means 3, a reply signal $Y_0$ showing that the preparation for "-write-in" or "readout" has been completed in response to the request signal $X_0$ is passed to the central processor 1 through a control signal line 17.

The buffer memory means 3 includes a buffer memory 18, buffer address register 19, buffer data register 23, associative register 28, first compare circuit 31, second compare circuit 35, encoder 34, control unit 41, and various signal lines for connecting these elements. The buffer memory 18 is commonly a high-speed memory having a capacity of several kilo bytes (KB) to several tens of kilo bytes, the speed of which is several to some ten times as high as that of the main memory 5. The buffer memory is internally divided into a plurality of sectors each of which is also divided into a plurality of blocks. For one read request, information of several tens of bytes corresponding to the capacity of a block is continuously read out of the main memory 5 so as to be stored in a predetermined one of the blocks of each sector which is appointed by the associative register 28.

The associative register 28 is adapted to hold the address signals representing the addresses at the main memory of the information stored in the respective sectors of the buffer memory 18 and a signal which represents whether the information in each block of the sectors is valid or invalid.

When a write request is applied to the control unit 41 from the central processor 1 through the control signal line 16, control signals are sent to the elements of the buffer memory means 3 in a predetermined order from the control unit 41, whereby the "write" cycle is initiated.

First of all, upper bits of the address signal applied from the address register 11 through the signal line 13 are imparted to the first compare circuit 31 so as to be compared with the respective address signals held in correspondence to the respective sectors of the associative register 28. If there is any sector for which the coincidence of address signal occurs, then a signal representing that sector appears on the signal line 33, and it is converted to an address signal representative of that sector of the buffer memory 18 by an encoder 34 so as to be transferred to the upper bits of the buffer address register 19. In the first compare circuit 31, after detection of said sector, an output signal representative of said sector is transferred to the associative register 28 through a signal line 49. Furthermore, detection is made of whether coincidence has occurred also in any block of said sector, and if so, a control signal for initiating "write operation" in the buffer memory is imparted to the control unit 41 through a control signal line 50. Thus, under the control of the control unit 41, the address signal from the encoder 34 and lower bits signal of the address signal from the address register 11 are applied to the buffer address register through signal lines 21 and 20, respectively, so as to be held therein, and then imparted to the buffer memory 18 as an address signal. A data signal is supplied to a data buffer register 23 through the signal 14 so as to be held therein, and then imparted to the buffer memory 18 through a signal line 24. Thus, the writing operation is performed.

The write request is transferred from the control unit 41 also to the main memory through signal lines 43 and 47, so that the "write operation" in the main memory is performed by means of the address signal applied thereto from the address register 11 through the signal line 40 and the data signal applied from the buffer data register 23 thereto through the signal line 26. Further, the upper bits signal of the address signal is imparted to a gate circuit 45 through a signal line 39 and transferred to the buffer memory means 4 under the control of a signal WXO representing the presence of write request applied from the control unit 41 to the gate circuit 45 through control signal lines 42 and 46.

In a similar manner, for a write request from the central processor 2, an upper bits signal of the address signal is transferred from the buffer memory means 4 to the second compare circuit 35 of the buffer memory means 3 through signal line 37. Compared in the second compare circuit 35 are the upper bits signals of the address signal from the buffer memory means 4 and the respective address signals corresponding to the respective sectors of the associative register 28 and which are supplied thereto through signal line 36. If there is any address signal which conforms to the upper bits signal, then a signal representing the sector corresponding to that address signal is imparted to the associative register 28 through a signal line 38 so as to reset and make invalid the bit representing whether the corresponding information in the buffer memory 18 is valid or invalid. As will be seen from the foregoing, the second compare circuit 35 is enabled to operate completely independently of the central processor 1.

Thus, during the comparison of the address signals effected by the second compare circuit 35, the central processor 1 and buffer memory means 3 are permitted to continue the writing or reading operation completely independently. The operation which is performed when a read request is sent from the central processor 1 is as follows. In the first compare circuit 31, the upper bits signal of the address signal and the content held in the associative register 28 are compared with each other so that detection is made of the fact that the information represented by the address signal is present in the buffer memory 18. Similar operations to the above-mentioned write request are performed until the address signal of the buffer memory 18 is set in the buffer address register 19. In the subsequent steps, a read request is sent from the control unit 41 to the buffer memory 18, so that a data signal read out of the buffer memory 18 is set in the buffer data register 23 through the signal line 25 and further set in the data register 12 through the signal line 15 in accordance with a reply signal $Y_0$ which is transferred from the control unit 41 to the central processor 1 through the control signal line 17.

Furthermore, if the absence of the wanted information in the buffer memory 18 is detected by the first compare circuit 31 and the resulting detection signal is transferred to the control unit 41, then the latter provides a read request to the main memory 5 through control signal lines 43 and 47, and the upper bits signal of the address signal on the signal line 13 is set in predetermined positions of the associative register 28 through signal line 29 respectively. When the information corresponding to the address signal imparted to the main memory 5 through the signal line 40 is read out of the main memory 5, the reply signal $BY_0$ is transferred to the buffer memory means 3 through control signal lines 48 and 44, and at the same time said information is transferred to the buffer data register 23 through the signal line 27. Furthermore, said information is controlled by the control unit 41 so as to be set in the buffer data register 23 and then in the data register 12 through the signal line 15 in accordance with the reply signal $Y_0$ transferred to the central processor 1 through the control signal line 17.

Also, said information is transferred from the buffer data register 23 to the buffer memory 18 through the signal line 24 so as to be written therein under the control of the control unit 41. Further, those information segments adjoining said information each of which corresponds to one block of the buffer memory 18 are successively read out of the main memory 5 so as to be transferred to the buffer data register 23 and then stored in the buffer memory 18 at the corresponding addresses thereof.

The central processor 2 and buffer memory means 4 are internally identical to the central processor 1 and buffer memory means 3, respectively, and operate exactly in the same way. That is, elements 51 to 90 correspond to the elements 11 to 50, respectively.

The central processors 1 and 2, buffer memory means 3 and 4 and main memory 5 include other various elements, although not shown in FIG. 1. However, those elements are omitted since they are not essential, in order that the present invention may be clearly understood.

Figure 2:
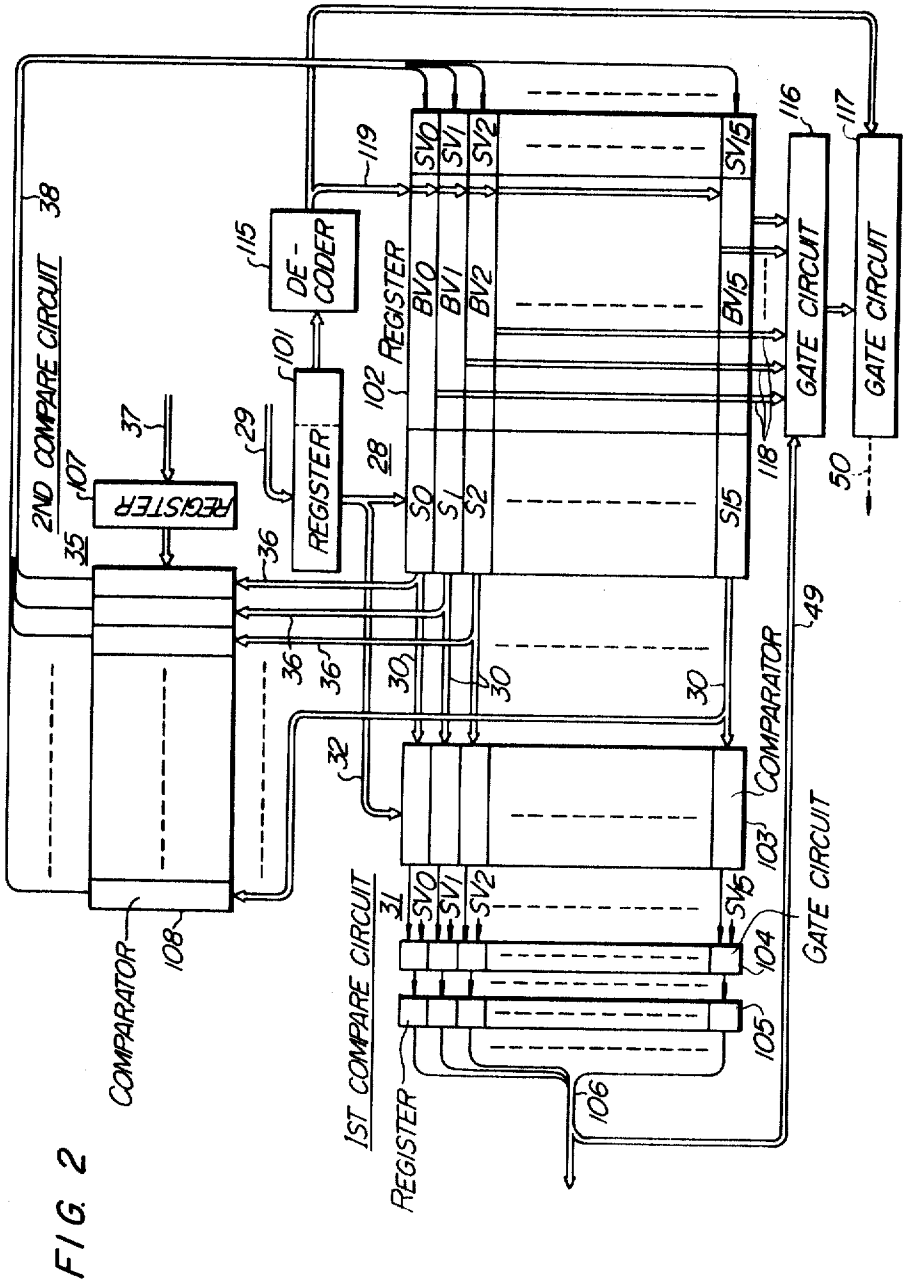
FIG. 2 is a diagrammatic view showing in detail a portion of the memory control apparatus of FIG. 1.

FIG. 2 schematically shows one embodiment of the memory control means of present invention, which includes an associative register 28, first compare circuit 31 and second compare circuit 35.

The associative register 28 comprises a register 101 adapted to temporarily hold the upper bits signal of address signal sent out by the central processor which corresponds to the sector and block, register 102 adapted to show what address information of the main memory is stored in what sector of the buffer memory, decoder 115 adapted to convert a part of the address signal set in the register 101 to the signal representing the block in the sector, and gate circuits 116 and 117 adapted to detect whether any valid information is stored in a predetermined block of the buffer memory. The register 102 comprises sector portions SO, S1, ....., S15 holding the upper bits signals corresponding to the sectors of the address signals representing the addresses of the information stored in the respective sectors, block validity portions BVO, BV1, ...., BV15 showing whether the valid information is stored in the respective blocks of each of the sectors, and sector validity portions SVO, SV1, ....., SV15 showing whether the information stored in the respective sectors is valid as a whole. Therefore, the buffer memory (not shown) comprises sixteen sectors. Thus, whenever new information is read out of the main memory to be transferred to the buffer memory, the upper bits signal of an address signal such new information is set in the register 101 through signal line 29, and the upper part of the upper bits signal which corresponds to the sector is set in the predetermined one of the sector portions of the register 102, so that the corresponding one of the portions SVO, SV1, ....., SV15 is simultaneously set. Further, the lower part of the upper bits signal set in the register 101 is converted to a signal representing one of the blocks by the decoder 115, and then imparted to the block validity portion BVO, BV1, ....., BV15 of the register 102 through a signal line 119. Thus, the output signal of the decoder 115 shows in what block is stored the information read out block by block, and that predetermined bit in BVO, BV1, ....., BV15 of the register 102 which corresponds to said sector portion is set through the signal line 119. When the upper part of the upper bits signal corresponding to the sector is set in SO, S1, ...., S15, but the lower part thereof is not set in BVO, BV1, ..., BV15, namely, when new information is read out of the main memory to be transferred to a new block of the buffer memory, each bit of the block validity portions BVO, BV1, ....., BV15 corresponding to said new block is alone set through the decoder 115. In case new information is read out to be transferred to the buffer memory when all the sector portions SO, S1, ....., S15 are full of the address signals of the valid information, that one of these sectors which is relatively not frequently used or which stores old information is selected, and the block validity portions of the thus selected sector and the sector validity portion corresponding to the selected sector are all reset, and the upper part of the address signal corresponding to the new information is set in one of sector portions SO, S1, ...., S15 which corresponds to the selected sector.

The first compare circuit 31 comprises a comparator 103 adapted for comparing the upper part of the address signal transferred from the central processor thereto and each of the address signals set in SO, S1, ....., S15 of the register 102 to thereby detect coincidence therebetween, a gate circuit 104 for gating the respective output signals available from the comparator 103 with the signals SVO, SV1, ...., SV15 representing the validity of the respective sectors, and a register 105 for temporarily holding the output of the gate circuit 104. As shown in the drawing, the comparator 103 is connected with the respective sector portions SO, S1, ...., S15 of the register 102 through signal lines 30 and is adapted to compare the upper part of the upper bits signal applied thereto by the register 101 through signal line 32 and the upper parts of the respective address signals held in the respective sector portions so as to provide output signals in accordance with the coincidence between the upper parts. Since there may occur such occasion that even if there is coincidence between the upper parts, the corresponding sector is made invalid, the output signals are subjected to the AND function with respect to SVO, SV1, ....., SV15 in the gate circuit 104, and thus a signal indicating that sector which holds information corresponding to an address signal sent from the central processor is set in the register 105. The signal set in the register 105 is transferred to the encoder 34 shown in FIG. 1 through signal line 106 so as to be converted to a four-bit signal corresponding to the upper bits signal of the actual address of the buffer memory 18 and then set in the upper part of the buffer address register 19. Further, the signal set in the register 105 is passed to agate circuit 116 through signal line 49 so as to select a block validity portion from the block validity portions BVO, BV1, ...., BV15 connected to the gate circuit 116 through signal lines 118. The output signal of the gate circuit 116 is in turn passed to a gate circuit 117 and controlled in selection by the output signal of the decoder 115 which represents each block in each sector. Thus, detection of coincidence is effected with respect to not only the sectors, but also the blocks, and the resulting detection signal is transferred to the control unit 41 shown in FIG. 1 through control signal line 50. Upon receipt of the detection signal representing coincidence with respect to both the sectors and blocks, the control unit 41 starts access to the buffer memory 18, as already described above.

The second compare circuit 35 comprises a register 107 for setting the upper bits of the address signal imparted thereto by the other central processor when the latter performs the writing operation with respect to the main memory, and a comparator 108 for comparing the upper bits of said address signal and each of the address signals set in the respective sector portions of the register 102. The operation of the comparator 108 is similar to that of the aforementioned comparator 103 except that the input signals to be compared are the upper bits of the address signal sent from the other central processors. The output signals of the comparator 108 are supplied to the register 102 through signal line 38, thus resetting the sector validity portion corresponding to a sector in which the address signal has the same upper bits as the address signal sent from the other central processor and the block validity portion corresponding to said sector. Every time the content of the main memory is rewritten by the other central processors, information in the sector which has the information rewritten by the other control processors is made invalid, so that it is possible to avoid disagreement between the information stored in the main memory and that stored in the buffer memory.

In the case of the embodiment shown in FIG. 2, the operation of the present invention is by no means influenced, even if the sector validity portions SVO, SV1, ....., SV15 of the register 102 and gate circuit 104 are omitted.

Figure 3:
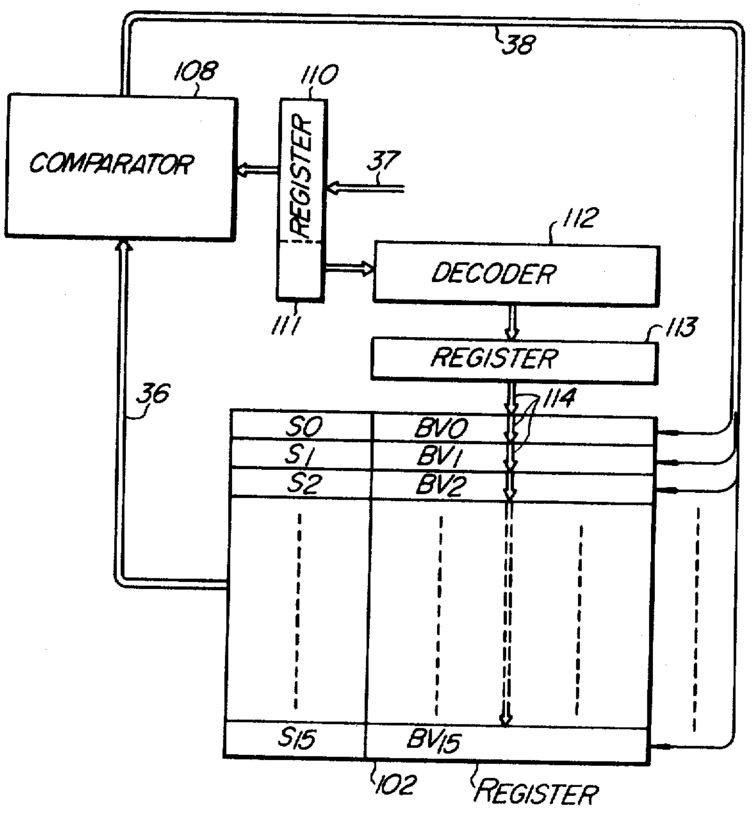
FIG. 3 shows the main portion of the memory control apparatus according to a second embodiment of the present invention.

FIG. 3 is a block diagram showing the main portion of another embodiment of the present invention, wherein stored information is made invalid with each block of each sector as the unit.

In the embodiment shown in FIG. 2, since all the information in each sector is made invalid, information which should not be rewritten is also made invalid. Therefore, in case that information which should not be rewritten is needed, it is necessary to again read the same out of the main memory. However, in case the information in the main memory has been rewritten by one of the central processors, the probability that this information has been transferred to the buffer memory of the other central processor is very low. Therefore, no practical problem arises even in the embodiment of FIG. 2. The embodiment of FIG. 3 is so designed as to further increase the efficiency.

Referring to FIG. 3, numeral 112 represents a decoder for decoding the lower part corresponding to the blocks of the upper bits signal of the address signal applied to the register 110 through signal line 37 by the other central processor so as to convert them to signals corresponding to the blocks. The block signals are set in a register 113 and then imparted to the portions BVO, BV1, ...., BV15 indicating the validity of the blocks of the register 102 through signal line 114 respectively. Further, the block signals are gated with the signal indicating the coincident sector transferred through signal line 38, thus resetting a bit in the block validity portion which is indicated by the block signals. The comparator 108 compares the upper part of the address signal set in the register 110 and the respective address signals held in the register 102 so as to transfer a signal representing any sector which stores the information corresponding to the address signal set in the register 102 to the signal line 38. As will be seen from the foregoing, the embodiment of FIG. 3 is different from that of FIG. 2 in that after any sector has been detected, the block of that sector is also appointed and made invalid.

Figure 4:
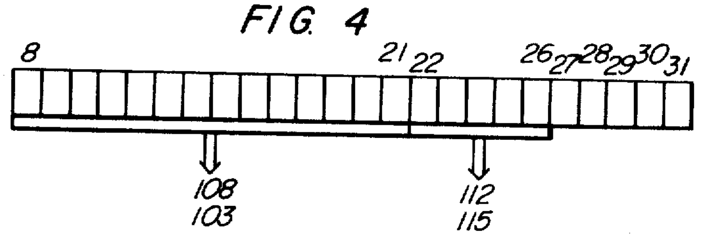
FIG. 4 is a diagram showing the construction of an address signal.

FIG. 4 shows an example of the address signal construction, from which it will be seen that one word consists of 32 bits and the address consists of 24 bits as indicated at 8 to 31. Fourteen bits indicated at 8 to 21 of the address correspond to the sectors, and they are imparted to the comparator 108 shown in FIG. 3 or comparator 103 shown in FIG. 2 and the sector portions SO, S1, ...., S15 of the register 102. Thus, the first or second compare circuit 31 or 35 detects whether the same one as the 14-bit address signal is present in SO, S1, ...., S15 of the register 102. The output signal of the first compare circuit 31 is converted to the addresses of the buffer memory 18 by means of the encoder 34 shown in FIG. 1 so as to be set in the upper bits of the buffer address register 19. Ten bits indicated at 22 to 31 correspond to an address signal which appoints the blocks in each sector and even bytes, showing that each sector consists 1 KB. If it is assumed that each of the sectors is constituted by 32 blocks each consisting of 32 bytes, then, as an address signal corresponding to a block, five bits indicated at 22 to 26 are supplied to the decoder 112 shown in FIG. 3 or decoder 115 shown in FIG. 2 so as to be converted to any one of the 32 blocks. The bits less significant than 22 of the address signal also constitute the portions which are set in the lower bits of the buffer address register 19 sown in FIG. 1.

Figure 5:
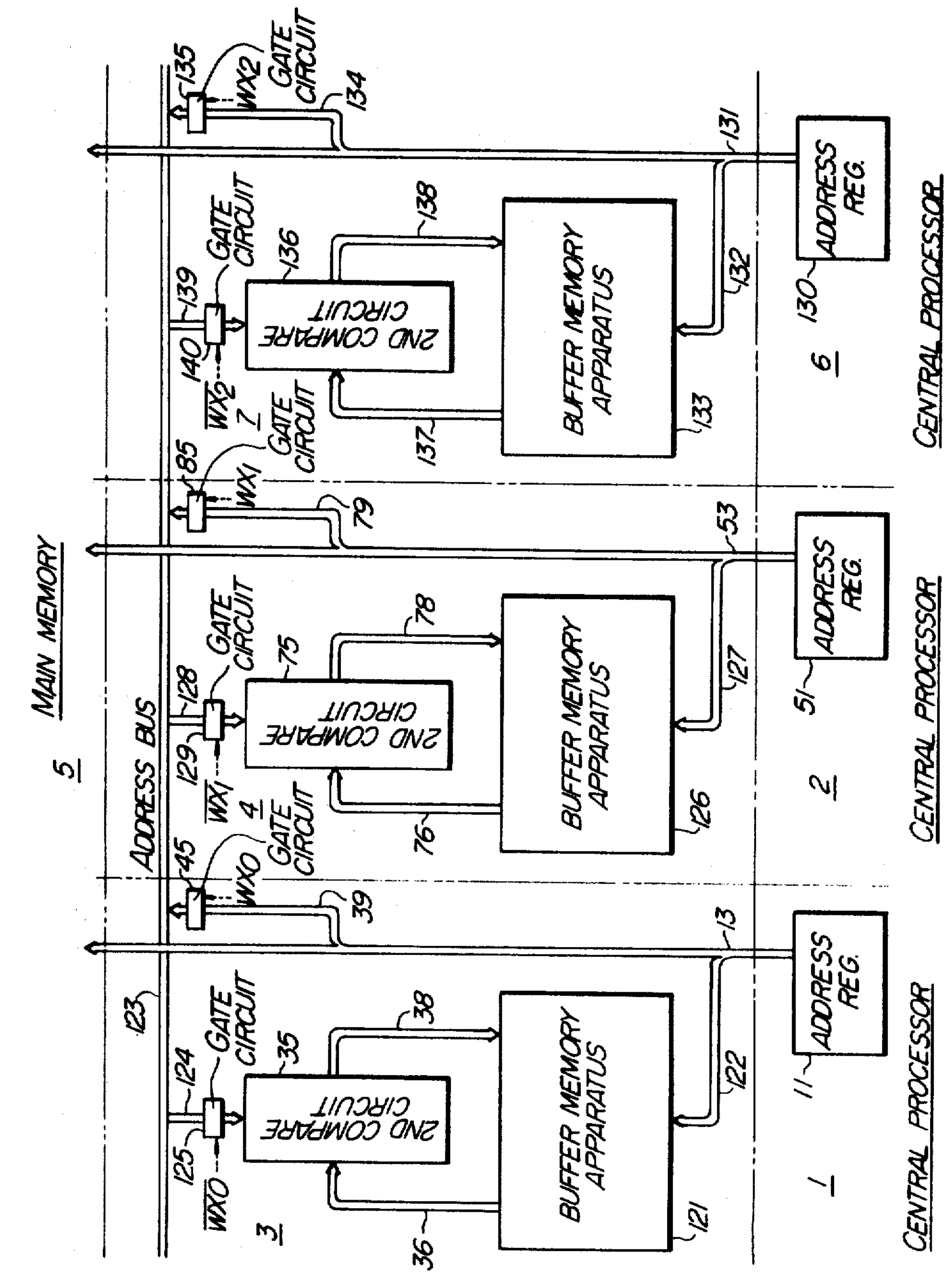
FIG. 5 is a block diagram showing the main portion of the memory control apparatus according to a third embodiment of the present invention.

FIg. 5 diagrammatically shown a further embodiment of the present invention, wherein there are provided three central processors and buffer memory means.

The embodiment of FIG. 1 has such a disadvantage that a large number of signal lines are entangled in the case where an increased number of central processors are provided since address signals are transferred to other buffer memory means through different signal lines 37 and 77. The embodiment shown in FIG. 5 is adapted to eliminate the entanglement of the signal lines by employing an address bus, and therefore it can be utilized irrespective of the number of central processors.

In FIG. 5, numeral 123 indicates the address bus through which address signals are transferred to second compare circuits 35, 75 and 136 of the respective buffer memory means 3, 4 and 7 under the control of gates 125, 129 and 140. Numerals 121, 126 and 133 denote combinations of the buffer memory, associative register, first compare circuit encoder, etc. shown in FIG. 1 respectively, each of which will be referred to as buffer memory apparatus hereinafter.

An address signal transferred from the address register 11 of the central processor 1 through signal line 13 is then transferred to the buffer memory means 3 through signal line 122, and at the same time the upper bits thereof are transferred to the gate 45 through signal line 39. The gate 45 is adapted to be gated by a signal WXO which occurs when a write request is provided to the main memory by the central processor 1 so that the upper bits of the address signal are passed to the address bus 123. The address signal on the address bus 123 is passed to gates 125, 129 and 140 through signal lines 124, 128 and 139 respectively so as to be transferred to the second compare circuit of the other central processor issuing no write request, under the control of signals $\overline{WXO}$, $\overline{WX1}$, $\overline{WX2}$ showing that the respective central processors 1, 2 and 6 provide no write request to the main memory. Thus, when a write request is provided to the main memory by any of the central processors, detection is made as to whether the same information has been read out of the buffer memory of the other central processor, so that disagreement of stored contents can be avoided, as will be apparent also from the embodiments shown in FIGS. 2 and 3.

The central processors 2 and 6 and buffer memory means 4 and 7 operate in exactly the same manner as the central processor 1 and buffer memory means 3. In the embodiment shown in FIG. 5, the control unit and arrangement related to data signals may be the same as those shown in FIGS. 1 to 4, and, therefore, they are all omitted.

What is claimed is:

1. A memory control apparatus in a multiprocessor system comprising:
- a plurality of central processors;
- a main memory to which said plurality of central processors are commonly accessible;
- a plurality of buffer memories each provided in correspondence to each central processor respectively, for reading out and storing information stored in its corresponding main memory by a predetermined amount; and
- a plurality of memory control means each provided in correspondence to each said buffer memory respectively, for controlling write-in and readout information to its corresponding buffer memory, wherein each of said memory control means comprises
- means for detecting whether or not an information required by its corresponding central processor is stored in the corresponding buffer memory as valid information thereof, and
- means for detecting whether or not an information to be rewritten in the main memory by any of the other central processors has been stored in said buffer memory of the corresponding central processor.

2. A memory control apparatus in a multiprocessor system according to claim 1, wherein each of said buffer memories comprises a plurality of sectors and each of said memory control means comprises register means for holding the address signals of that information in the main memory which is stored in the respective sectors of the buffer memories, a first compare means for comparing address signal imparted thereto by said corresponding central processor and the address signals corresponding to the respective sectors held in said register means and a second compare means for comparing address signals of information to be rewritten in the main memory by any of the other central processors and the address signals corresponding to the respective sectors held in said register means to thereby make invalid any sector in said register means the address signal in which conforms to the address signal of said information of sectors which contains information to be rewritten by any of the other central processors.

3. A memory control apparatus in a multiprocessor system according to claim 1, further comprising an address bus to which are passed the address signals of certain information to be rewritten in the main memory by the respective central processors, so that those address signals are transmitted therethrough to said memory control means of the other central processors.

4. A memory control apparatus in a multiprocessor system according to claim 2, wherein said first compare means comprises a first compare circuit for comparing an address signal forwarded thereto by said corresponding central processors with the respective address signals corresponding to the respective sectors stored in said register means so as to provide a signal representing a sector whose address signal is coincident with said address signal from said corresponding central processor, and an encoder for converting the signal representing said coincident sector to the address corresponding to the sector in the buffer memory.

5. A memory control apparatus in a multiprocessor system according to claim 2, wherein said register means comprises registers each including a sector portion for storing the upper part of the address signal of information stored in the predetermined sector of the buffer memory and a block validity portion indicating whether valid information is stored in the respective blocks in each sector, means for setting in said sector portion the upper part of the address signal of information read out of the main memory, and decoder means for converting the lower part of said address signal to a signal representing a block in each sector so as to set the converted signal in said block validity portion.

6. A memory control apparatus in a multiprocessor system according to claim 5, wherein said register means further includes gate means for detecting the signal representing the validity of the block stored in said block validity portion by using as gate signals the signal representing the coincident sector generated by said first compare means and the signal representing the block generated by said decoder.

7. A memory control apparatus in multiprocessor system according to claim 5, wherein said second compare means comprises a comparator for comparing the upper part of the address signal forwarded by the other central processors with the respective address signals corresponding to the respective sectors stored in said sector portion so as to provide a signal representing the coincident sector, and decoder means for converting the lower part of the address signal forwarded by said other central processors to a signal representing the block so as to reset the bit of said block validity portion corresponding to said block under the control of said signal representing the coincident sector.

8. A memory control apparatus according to claim 4, wherein said register means comprises registers, each including a separate portion for storing the upper part of the address signal of information stored in the predetermined sector of the buffer memory and a block validity portion indicating whether valid information is stored in the respective blocks in each sector, means for setting in each sector portion the upper part of the address signal of information readout of the main memory, and decoder means for converting the lower part of said address signal to a signal representing the block in each sector, so as to set the converted signal in said block validity portion.

9. A memory control apparatus according to claim 8, wherein said register means further includes gate means for detecting the signal representing the validity of the block stored in said block validity portion by using as gate signals the signal representing the coincident sector generated by said first compare means and the signal representing the block generated by said decoder.

10. An apparatus according to claim 9, wherein said first compare circuit comprises a first compare circuit comparator for comparing the upper part of the address signal transferred from the central processor thereto and each of the address signals set in the respective sector portions of said registers in said register means, and providing output signals representative of coincidence therebetween, a gate circuit for gating the respective output signals provided by said comparator with signals representing the validity of the respective sector portions, and a register for temporarily storing the output of said gate circuit and for transferring the contents thereof to said encoder.

* * * * *